United States Patent
Kuramitsu et al.

[11] Patent Number: 6,149,289
[45] Date of Patent: Nov. 21, 2000

[54] ANGLED ILLUMINATION TUBE

[75] Inventors: Osamu Kuramitsu, Matsudo; Tadashi Murakami, Kashiwa; Keiji Sakamoto; Makoto Yamada, both of Matsudo, all of Japan

[73] Assignee: Matsushita Electric Works, Ltd., Osaka, Japan

[21] Appl. No.: 09/313,631

[22] Filed: May 18, 1999

[30] Foreign Application Priority Data

Jul. 28, 1998 [JP] Japan .................................. 10-213304

[51] Int. Cl.$^7$ ....................................................... G02B 6/00
[52] U.S. Cl. ........................... 362/551; 362/32; 362/297; 362/344; 362/342; 362/290; 385/133
[58] Field of Search .................................... 362/297, 346, 362/342, 290, 32; 385/133

[56] References Cited

U.S. PATENT DOCUMENTS

| | | |
|---|---|---|
| 5,016,143 | 5/1991 | Aikens . |
| 5,117,478 | 5/1992 | Cobb, Jr. et al. . |
| 5,309,541 | 5/1994 | Flint ........................................ 385/133 |
| 5,995,698 | 11/1999 | Pezzano .................................. 385/133 |

*Primary Examiner*—Sandra O'Shea
*Assistant Examiner*—Anabel M Ton
*Attorney, Agent, or Firm*—Arent Fox Kitner Plotkin & Kahn PLLC

[57] ABSTRACT

An angled illumination tube is capable of reducing a dark spot behind the reflector, while illuminating the tube uniformly over the length of the tube. The tube is used in combination with a light source providing a light beam and comprises an angled transparent tubular conduit having a first end and a second end on opposite longitudinal ends of the conduit. The conduit has a bend between the first and second longitudinal ends, and is used with the first end receiving the light beam from the light source in order to guide the light beam along the length of the conduit. A reflector is disposed within the bend to reflect the light beam from the first end to direct a reflected light beam towards the second end. The reflector defines an incident light axis along which the light beam is guided to the reflector, and a reflected light axis along which the reflected light beam is directed to said second end. The reflector is composed of a plurality of mirrors arranged in a parallel array along a bisector that divides an included angle between the incident and reflected light axes at an angle ($\theta$) with respect to the incident light axis. Two adjacent ones of the mirrors are spaced at a fixed distance (d) along the bisector and of uniform length (L) measured within a plane including the incident and reflected light axes. The mirrors are arranged to satisfy the following relation:

$$d\tan\theta \le L \le \frac{3d}{2}\tan\theta$$

5 Claims, 7 Drawing Sheets

ANGLED ILLUMINATION TUBE

BACKGROUND OF THE INVENTION

1. Field of the Invention

The present invention is directed to an angled illumination tube adapted in use for guiding and distributing a light beam for emission of the light over the length of the tube, and more particularly to the illumination tube having a bend intermediate its ends.

2. Description of the Prior Art

Illumination tubes are widely utilized in the art as a long lighting system adapted in use to be routed along a wall, ceiling or the like structure of a building for lighting a wide area. U.S. Pat. No. 5,016,143 discloses a typical lighting tube which is L-shaped to have a bend intermediate its lengthwise ends. A light source is located at one lengthwise end of the tube to emit a light beam towards the bend. A single reflector is provided inside of the bend to reflect the light beam to direct a reflected light towards the opposite lengthwise end in order to illuminate the tube over the full length thereof by passing a portion of the light through a transparent wall of the tube. However, the use of the reflector inherently poses a problem of leaving a dark spot behind the reflector at the bend. In order to reduce the area of the dark spot, the reflector had to be made small which eventually lowers an efficiency of guiding the light past the reflector, failing to achieve uniform illumination over the entire length of the tube.

SUMMARY OF THE INVENTION

In view of the above problem, the present invention has been accomplished to provide an angled illumination tube which is capable of reducing a dark spot behind the reflector, while illuminating the tube uniformly over the length of the tube. The angled illumination tube in accordance with the present invention is adapted for use in combination with a light source providing a light beam and comprises an angled transparent tubular conduit having a first end and a second end on opposite longitudinal ends of the conduit. The conduit has a bend between the first and second ends, and is adapted to have the first end receiving the light beam from the light source in order to guide the light beam along the length of the conduit while allowing a part of the light beam to pass through a wall of the conduit. A reflector is disposed within the bend to reflect the light beam from the first end to direct a reflected light beam towards the second end. The reflector defines an incident light axis along which the light beam is guided to the reflector, and a reflected light axis along which the reflected light beam is directed to said second end. The reflector is composed of a plurality of mirrors which are arranged in a parallel array along a bisector that divides an included angle between the incident and reflected light axes at an angle ($\theta$) with respect to the incident light axis. Two adjacent mirrors are spaced at a fixed distance (d) along the bisector and of uniform length (L) measured within a plane including the incident and reflected light axes. The mirrors are arranged to satisfy the following relation:

$$d\tan\theta \leq L \leq \frac{3d}{2}\tan\theta$$

With this arrangement, it is possible to use the mirrors of reduced length (L) while assuring to reflect a sufficient amount of the light beam from the light source towards the second end, thereby minimizing the dark spot behind the reflector while reflecting sufficient amount of the light beam for uniform illumination along the length of the tube.

A supplementary reflector may be added to increase the amount of the reflected light beam. For this purpose, the supplementary reflector is located adjacent to one of the mirrors at a position offset from the array of the mirrors towards the second end. Preferably, the supplementary reflector is in the form of a transparent prismatic mirror which allows the light beam to pass through as well as to reflect the light beam in a diffused manner, thereby avoiding to cause a dark spot behind the supplementary reflector while increasing the amount of the reflected light beam.

Preferably, the mirrors in the array are held in a frame which is transparent to the light beam so that the mirrors can be readily located in an exact position, yet assuring to reduce the dark spot even in the employment of the frame.

In one embodiment, the tubular conduit is of a U-shaped configuration which includes a pair of first and second parallel straight cylinders connected by the bend of a generally semi-circular arc. The semi-circular arc extends about a center point and merges at its opposite ends into the first and second straight cylinders to define thereat a bend starting point and a bend ending point. Located at the bend starting point is an array of first deflectors which are arranged along a starting line passing through the center point in a generally perpendicular relation to an axial length of the first straight cylinder. The first deflectors are angled with respect to the axial length of the first straight cylinder to direct the light beam from the light source into the bend. A plurality of the arrays of the mirrors are located between the bend starting point and the bend ending point at an angularly spaced relation with one another about the center point. The mirrors in each array are arranged along each one of radial lines which pass commonly through the center point and form individual center angles of less than 90° with adjacent one of the radial lines so as to direct the light beam generally along a curved path of the bend. Located at the bend ending point is an array of second deflectors which are arranged along an ending line passing through the center point in a generally perpendicular relation to an axial length of the second straight cylinder. The second deflectors are angled with respect to the axial length of the second straight cylinder to direct the reflected light beam from the mirrors along the axial length of the second cylinder. Thus, the light beam can be successfully guided along the semi-circular arc bend, which is therefore a further object of the present invention.

These and still other objects and advantageous features of the present invention will become more apparent from the following description of the embodiments of the invention when taken in conjunction with the attached drawings.

DETAILED DESCRIPTION OF THE EMBODIMENTS

Figure 1:
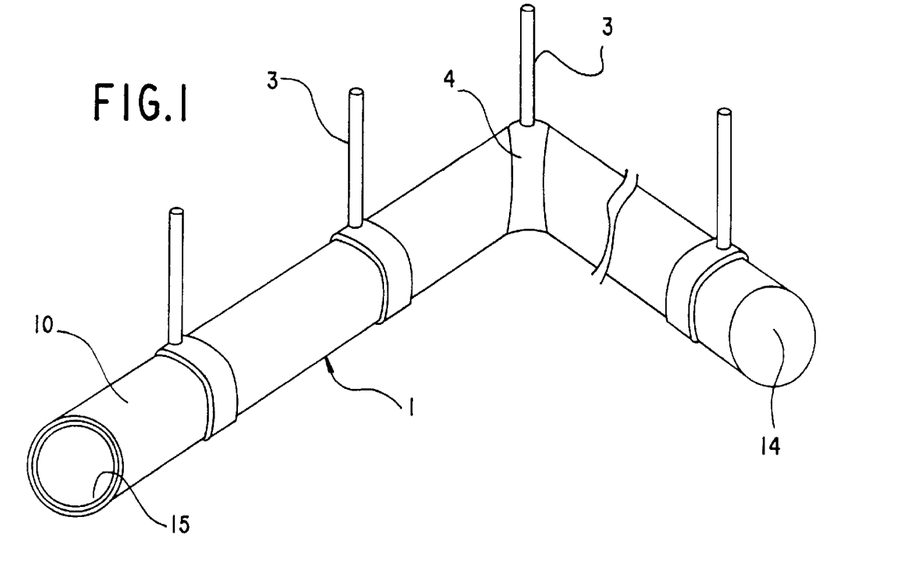
FIG. 1 is a perspective view of an angled illumination tube in accordance with a first embodiment of the present invention.
Figures 2, 3:
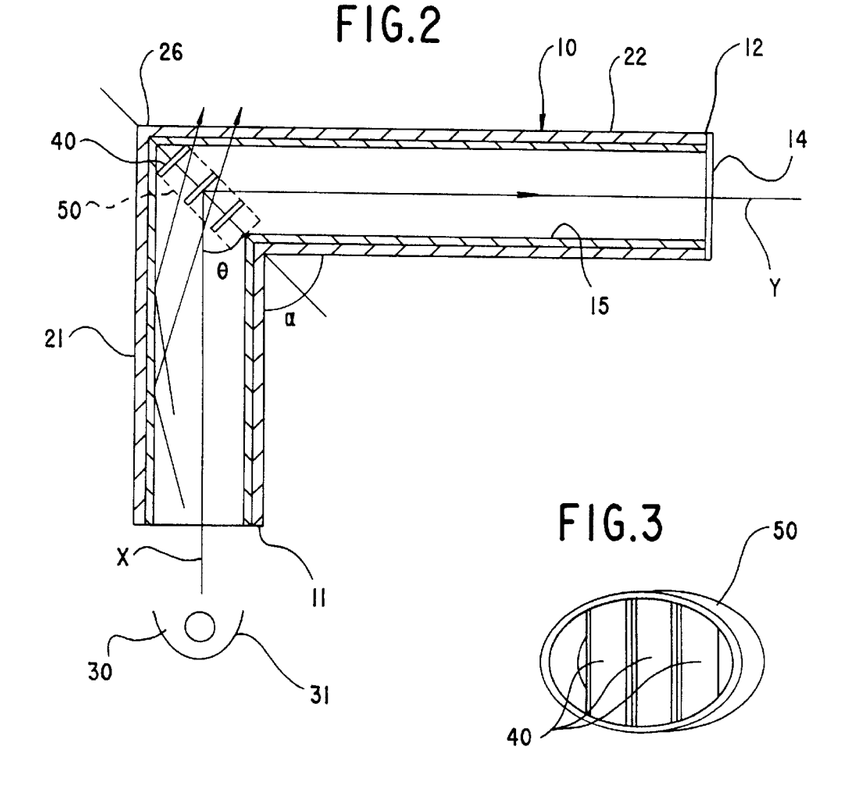
FIG. 2 is a sectional view of the above illumination tube.
FIG. 3 is a perspective view of a reflector frame utilized in the above tube.

Referring now to FIGS. 1 to 3, there is shown an angled illumination tube 1 in accordance with a first embodiment of the present invention. The tube 1 is shown to be suspended from a ceiling by means of hangers 3, and is composed of a transparent L-shaped tubular conduit 10 with a first straight portion 21 and a second straight portion 22 connected at an angle ($\alpha$) to the first straight portion 21 to form a bend 26 between first and second ends 11 and 12 on opposite ends of the tube. An external light source 30 with a reflector 31 is provided in proximity to the first end 11 of the first straight portion 21 to emit a light beam into the tube 1. The second end 12 of the second portion 22 is closed by a reflector 14. Alternatively, an additional light source may be provided in proximity to the second end 12 to introduce another light beam into the tube.

The conduit 10 is provided on its interior surface with a light conductive layer 15 in the form of a transparent prismatic film for guiding the light beam along the length of the conduit in such a manner as to repeat reflecting the light beam introduced at a small incident angle for proceeding the light beam to the end of the conduit while allowing the light beam introduced at a large incident angle to pass through the layer 15 and the wall of the conduit 10. The light beam of the large incident angle is constantly developed by diffused reflection on the surface of the layer 15 so as to illuminate the conduit over the full length thereof. An additional reflector film may be provided on one circumferential portion of the conduit to enhance the diffused reflection. Although the light beam from the light source 30 enters the conduit 10 at various incident angles, only portion of the light beam is illustrated in the attached figures for easy understanding of the concept of the present invention.

As shown in FIG. 2, an array of mirrors 40 are located at the bend 26 as a reflector to reflect the light beam from the light source to direct a reflected light beam to the second end 12 of the conduit 10. The array of the mirrors 40 within the bend 26 defines an incident light axis X along which the light beam is guided from the first end 11 to the reflector and a reflected light axis Y along which the reflected light beam proceeds towards the second end 12. The mirrors 40 are arranged on a bisector which divides an included angle ($\alpha$) between the incident light axis X and the reflected light axis Y at an angle ($\theta$) with respect to the axis X. Two adjacent ones of the mirrors 40 are spaced along the bisector at a distance (d). The mirrors 40 in the array are selected to have an uniform length (L) measured within a plane including the incident light axis X and the reflected light axis Y, and are arranged to satisfy the following relation:

$$d \tan\theta \leq L \leq \frac{3d}{2}\tan\theta$$

Figures 4, 5, 6:
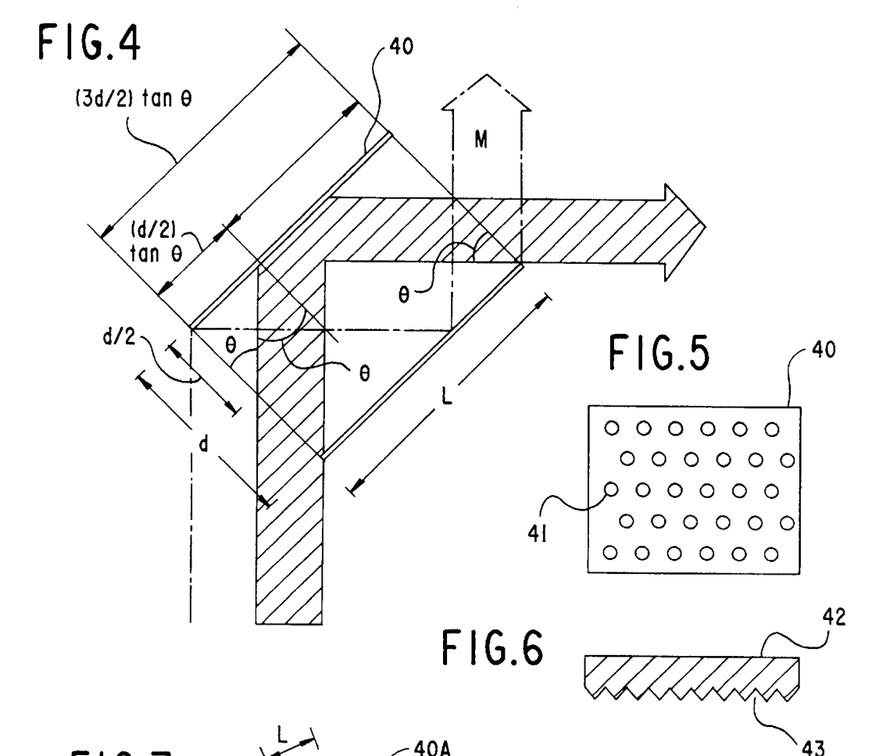
FIG. 4 is an explanatory view for an operation of the tube.
FIG. 5 is a plan view of a mirror which may be utilized in the above tube.
FIG. 6 is a sectional view of another mirror which may be utilized in the above tube.

When length (L) is selected to be equal to d tan $\theta$, 100% of the incoming light beam parallel to the incident light axis is theoretically reflected towards the second end. However, taking into consideration of the fact that the light beam includes the beam of various incident angles, it is found advantageous to use the mirrors of which length (L) is little bit longer than d tan $\theta$ in order to effectively reflect the light beam towards the second end. But, as shown in FIG. 4, when length (L) is longer than (3d/2) tan $\theta$, an amount of the light beam M reflected twice on the opposed two mirrors 40 and proceeding in the original direction along the incident light axis becomes critical, thereby reducing considerably the reflected light beam to be directed towards the second end 12. Therefore, the length (L) is defined by the above relation in order to efficiently reflecting the light beam towards the second end, while limiting the length (L) of the mirrors 40 to reduce the dark spot therebehind, as is seen in FIG. 2.

The mirrors 40 are held in a frame 50 which is fitted within the bend 26 to easily locate the array of the mirrors at correct positions as defined in the above. The frame 50 is a generally elliptical to be easily assembled in position and is preferred to be transparent to the light beam for passing the light beam therethrough. It is noted in this connection that the hanger 3 for suspending the bend 26 has a strap 4 of which width is as small as possible only to cover the reduced dark spot and not to shield the illuminating bend portion.

The mirror 40 may be a polished aluminum plate or a steel plate deposited with silver or aluminum. As shown in FIG. 5, the mirror 40 may be formed with a plurality of tiny perforations 41 which permits the light beam to pass therethrough for further reducing the dark spot in the bend 26. Alternatively, a prismatic mirror 42 of FIG. 6 may be utilized to provide diffused reflection. The prismatic mirror 42 having a plurality of prisms 43 on its one surface is transparent to the light beam to minimize the occurrence of the dark spot therebehind.

In the following figures illustrating modifications and embodiments of the present invention, the light source and the light conductor are omitted for simplicity of the drawings. However, the details of the structure could refer to the first embodiment as necessary.

Figures 7, 8:
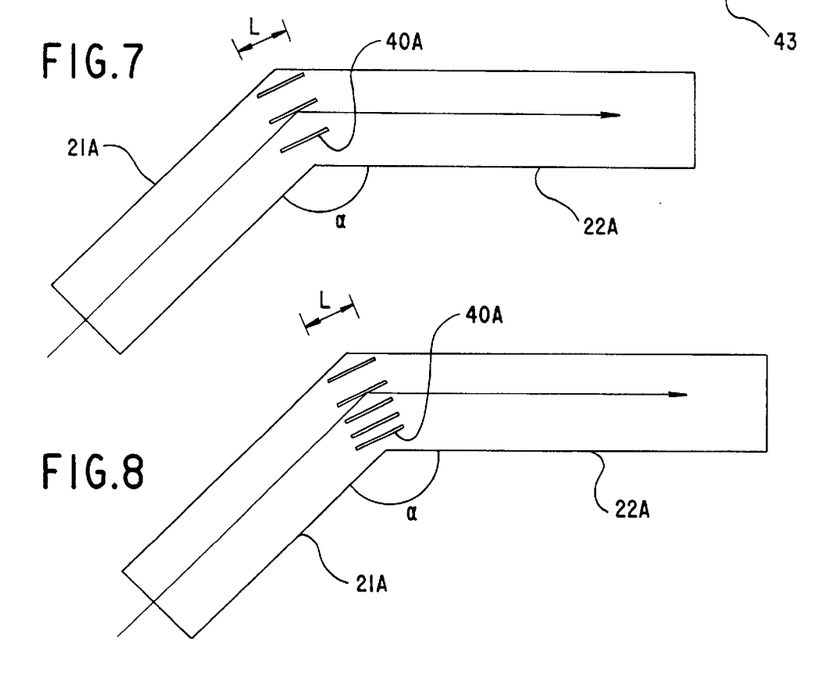
FIGS. 7 and 8 are schematic views respectively illustrating modifications of the above tube.

FIGS. 7 and 8 illustrate modified illumination tubes in which first and second straight portions 21A and 22A are bent at an obtuse angle ($\alpha$). An array of mirrors 40A of uniform length (L) is positioned in the bend while spacing the mirrors at a uniform distance (FIG. 7) or varying distance (FIG. 8). Length (L) and distance (d) of the mirrors 40A follow the above relation.

Figure 9:
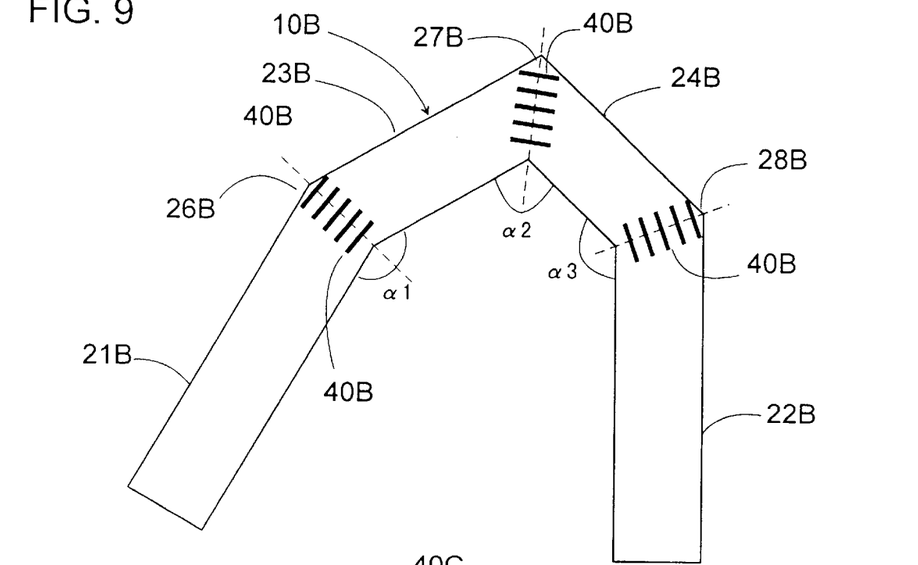
FIG. 9 is a schematic view of an angled illumination tube in accordance with a second embodiment of the present invention.

FIG. 9 illustrates an angled illumination tube in accordance with a second embodiment of the present invention. The illumination tube includes a conduit 10B which has a plurality of bends 26B, 27B, and 28B at included angles of ($\alpha$1, $\alpha$2, $\alpha$3) between two adjacent ones of straight portions 21B, 23B, 24B, and 22B. An array of mirrors 40B is disposed within each bend and arranged along a bisector of the included angles of ($\alpha$1, $\alpha$2, $\alpha$3). The mirrors 40B are selected to have a length (L) and spaced by a distance (d) in accordance with the relation as defined in the first embodiment, in order to direct the light beam from the light source all through the angled path of the conduit, while illuminating the whole length of the conduit.

Figure 10:
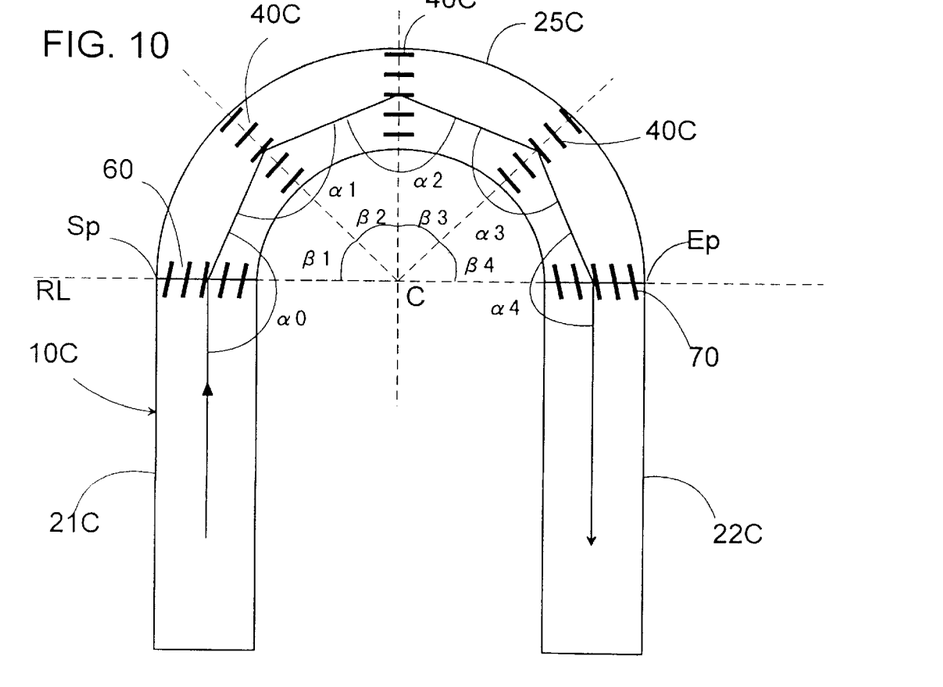
FIG. 10 is a schematic view of an angled illumination tube in accordance with a third embodiment of the present invention.

FIG. 10 illustrates an angled illumination tube in accordance with a third embodiment of the present invention. The tube includes a conduit 10C which has a parallel pair of first and second straight portions 21C and 22C which are connected by a bend 25C of a generally semicircular arc extending around a center point C. The bend 25C has its opposite ends merged respectively into the first and second straight portions 21C and 22C to define thereat a bend starting point Sp and a bend ending point Ep which lie on a reference line RL passing through the center point C in a perpendicular relation to an axial length of each of the first and second straight portions 21C and 22C. Three arrays of mirrors 40C are disposed in the bend 25C in an equally angularly spaced relationship around the center point C with the arrays of each array being arranged along a radial line or bisector of the included angle of (α1, α2, α3) between two adjacent ones of the bisectors. The bisectors or radial lines are selected such that the first radial line extend at an angle of β1 with respect to the reference line RL, the second radial line extend at an angle of β2 with respect to the first radial line, the third radial line extends at an angle of β3 with respect to the second radial line and at an angle of β4 with respect to reference line RL. As seen in the figure, the angles β1 to β4 are determined to be less than 90° in order to effectively guide the reflected light along the arcuate path of the bend 25C. The mirrors 40C in each array is designed and arranged to follow the relation as defined in the first embodiment.

An array of first deflectors 60 is disposed at the starting point Sp of the bend 25C, i.e., the juncture of the bend with the first straight portion 21C, in order to deflect the light beam from the light source towards the first array of the mirrors 40C, the major axis of the deflected light is shown to extend at an angle of α0 with respect to that of the light beam from the light source. Also, an array of the second deflector 70 is disposed at the ending point Ep in order to deflect the reflected light beam from the third array of the mirrors 40C to direct the light beam along the length of the second straight portion 22C. Thus, the light beam from the first straight portion can be successfully guided through the arcuate bend 25C to the second straight portion to illuminate the all the way of the tube, while reducing the dark spots behind the mirrors 40C. The first and second deflectors are arranged along the reference line RL and are spaced at a regular distance and are selected to have the length in accordance with the relation as defined in the first embodiment, thereby reducing the dark spot behind the deflectors 60 and 70, while effectively transmitting the light beam into the bend 25C.

Figure 11:
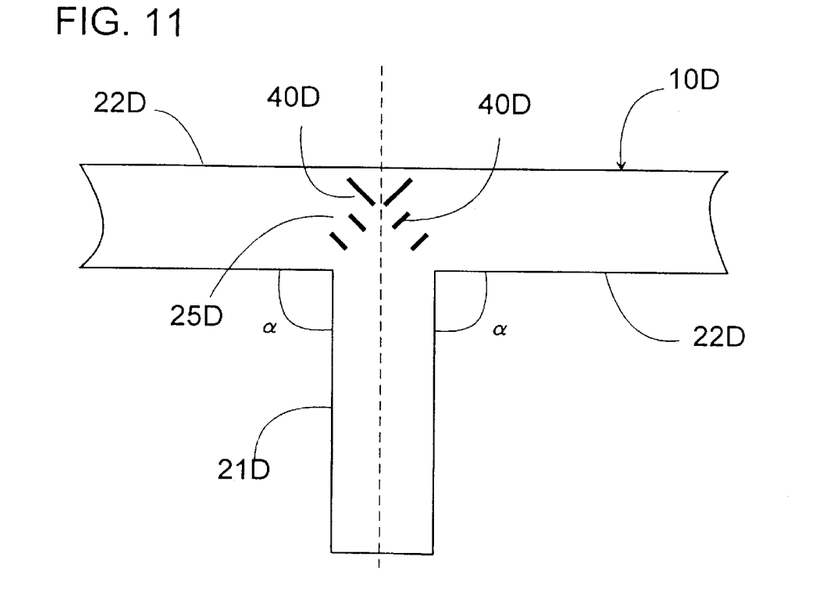
FIGS. 11 to 18 are schematic views illustrating various angled illumination tubes in accordance with other preferred embodiments of the present invention.

FIG. 11 illustrates an angled illumination tube in accordance with a fourth embodiment of the present invention in which the tube is T-shaped to direct the light beam in two opposite directions. The tube includes a conduit 10D which has a first straight portion 21D from which two second straight portions 22D extends in mutually opposite directions through a bend 25D. Two arrays of mirrors 40D are located within the bend 25D with the mirrors of each array being arranged along a bisector of the included angle (α). The outermost mirrors of the arrays remote from the straight portion 21D is somewhat offset laterally with respect to the bisector to form a gap between the outermost mirrors for passing therethrough the light beam from the first straight portion 21D for illumination of the bend 25D at a portion opposite to the first straight portion. The mirrors of each array are selected to satisfy the relation as defined in the first embodiment.

Figure 12:
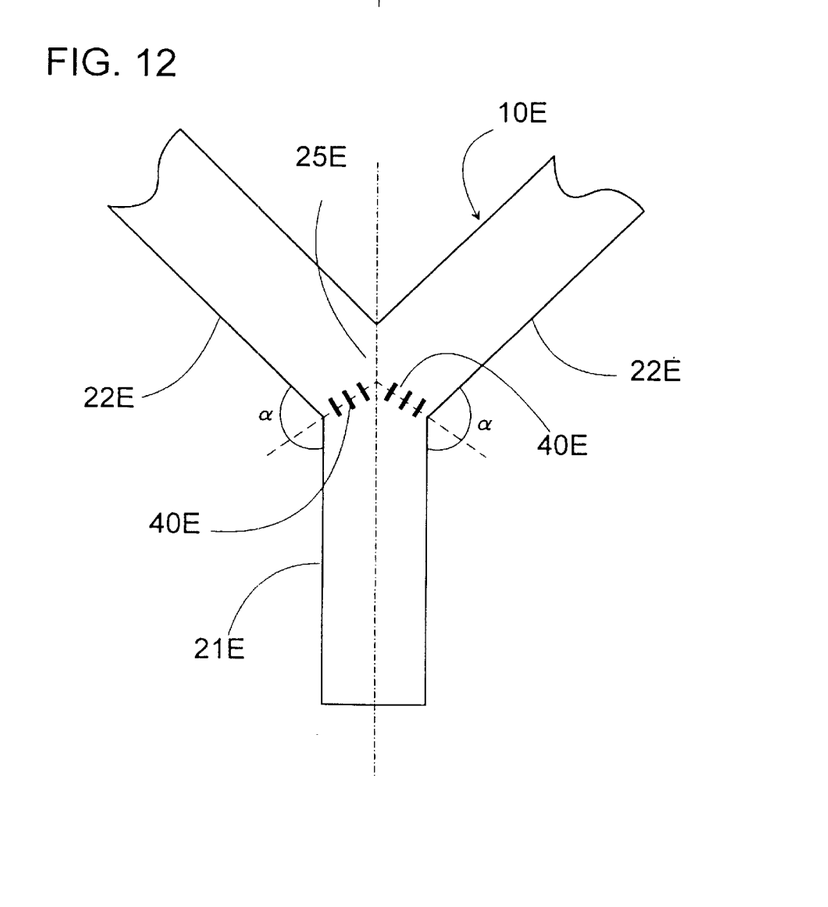

FIG. 12 illustrates an angled illumination tube in accordance with a fifth embodiment of the present invention in which the tube is Y-shaped to direct the light beam in two directions. The tube includes a conduit 10E which has a first straight portion 21E from which the two second straight portions 22E are bifurcated through a bend 25E at an angle of (α) with respect to the length of the first straight portion 21E. Two arrays of mirrors 40E are located at the bend 25E to reflect the light beam from the first straight portion respectively into the second straight portions 22E. The mirrors of each array are selected to satisfy the relation as defined in the first embodiment. A gap is provided between the arrays of the mirrors to pass through the light beam for illumination of an inside corner of the bend located on the axial length of the first straight portion.

Figure 13:
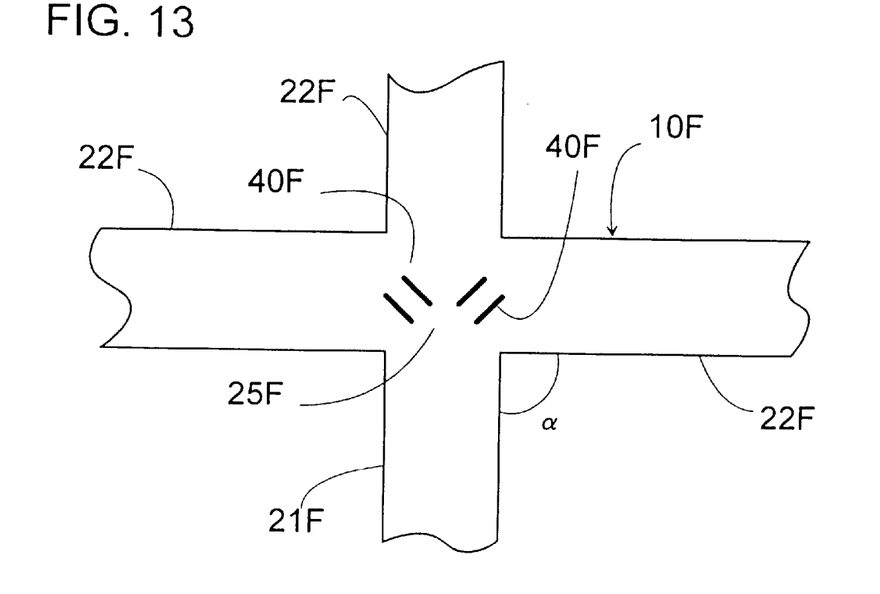

FIG. 13 illustrates an angled illumination tube in accordance with a sixth embodiment of the present invention. The tube includes a conduit 10F which is cross-shaped to direct the light beam from a first straight portion 21F to a three second straight portions 22F which are angled in a mutually perpendicular relation to each other. Two arrays of mirrors 40F are disposed in a cross-bend 25F to reflect the light beam from the first straight portion 21F to the two second straight portions 22F at a right angle (α). The arrays are spaced from one another to form a gap therebetween for passing the light beam from the first straight portion 21F to the remaining second straight portions aligned with the first straight portion 21F. The mirrors of each array are selected to satisfy the relation as defined in the first embodiment.

Figure 14:
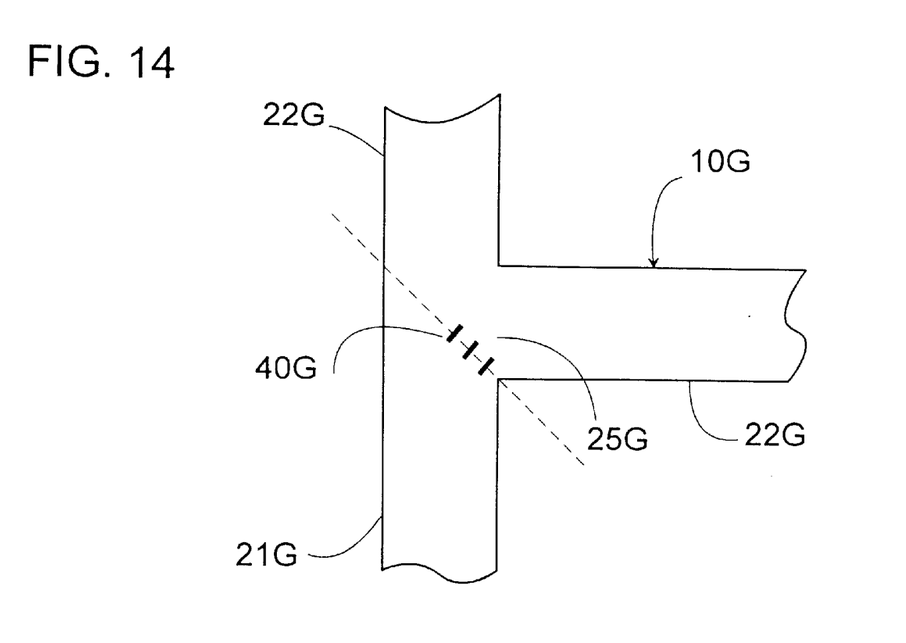

FIG. 14 illustrates an angled illumination tube in accordance with a seventh embodiment of the present invention. The tube includes a conduit 10G which is T-shaped to direct the light beam from a first straight portion 21G to two second straight portions 22G in two mutually perpendicular directions, i.e., 90° and 180°. An array of mirrors 40G is disposed within a bend 25G at an inside corner between the first straight portion 21G and the second straight portion 22G at a right angle with the first straight portion. The mirrors 40G are arranged along a bisector of angle (α) in an offset relation towards the inside corner to form a gap opposite of the inside corner, permitting the light beam from the first straight portion to pass therethrough into the other second straight portion 22G aligned with the first straight portion. The mirrors of the array are selected to satisfy the relation as defined in the first embodiment.

Figure 15:
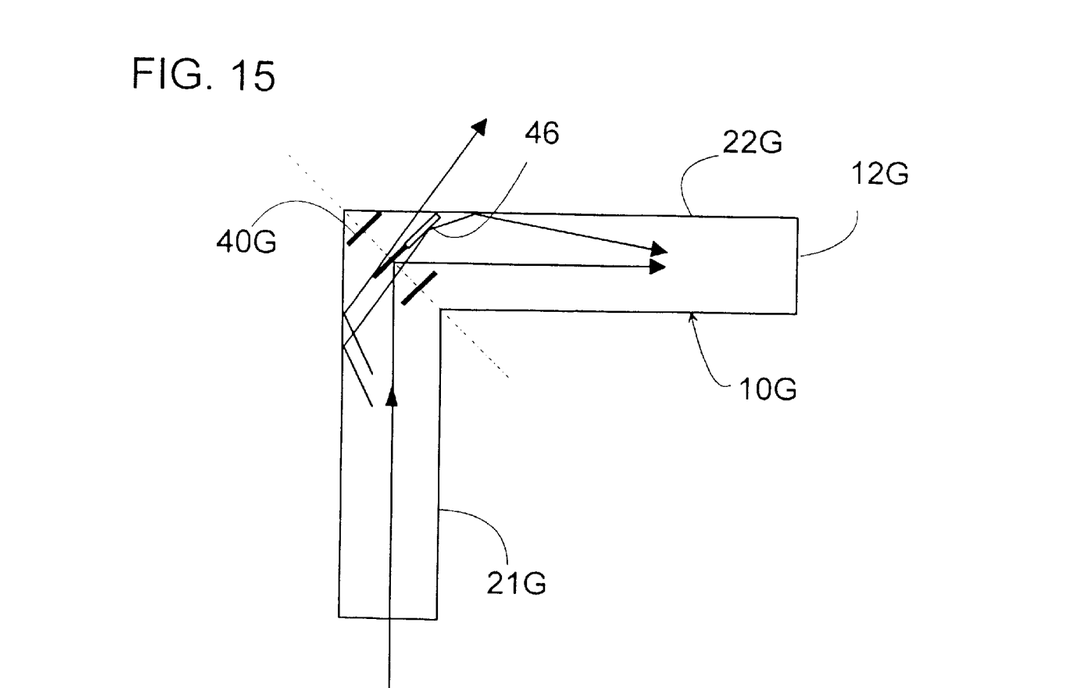

FIG. 15 illustrates an angle illumination tube in accordance with an eighth embodiment of the present invention which is similar to the first embodiment except for an addition of a supplementary mirror 46. The supplementary mirror 46 is located adjacent to an array of the mirrors 40H at a position offset towards a second straight portion 22G in order to increase the amount of reflected light beam directed into the second straight portion. For this purpose, the supplementary mirror 46 is held in parallel with one of the mirrors in proximity therewith as shown in the figures. The supplementary mirror 46 may be in the form of a half mirror such as the prismatic sheet of FIG. 6, or the semi-transparent mirror of FIG. 5. When the prismatic sheet is utilized as the supplementary mirror 46, it is preferred that a line passing through ridges of prisms is set to be perpendicular to the bisector. Like parts are designated by like reference numerals with a suffix letter of "G".

Figure 16:
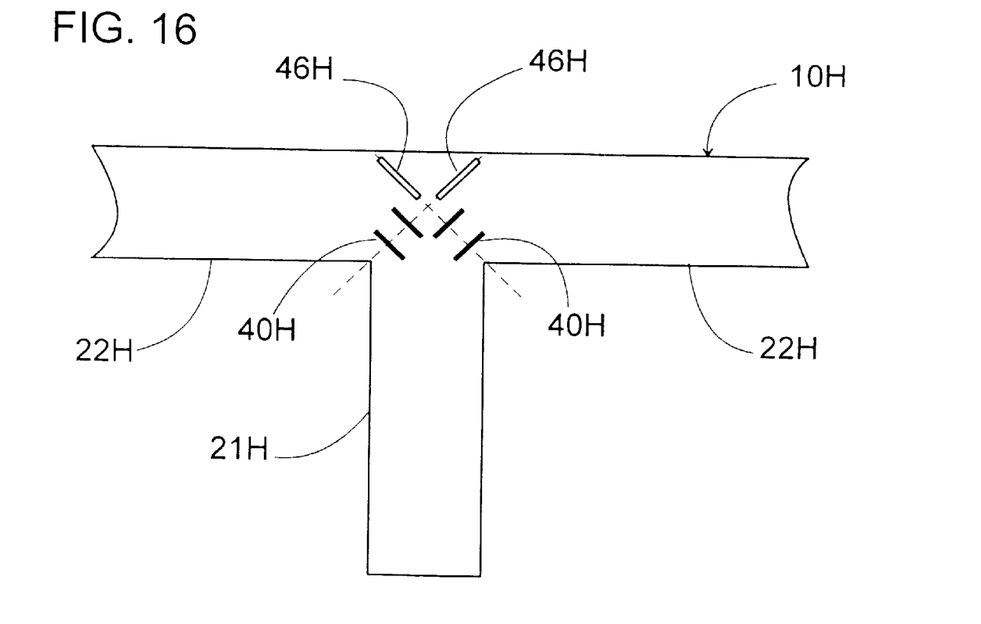

FIG. 16 illustrates an angled illumination tube in accordance with a ninth embodiment of the present invention which is similar to the forth embodiment of FIG. 11 except for the addition of a supplementary mirror 46H. The supplementary mirror 46H is provided for each of arrays of mirrors 40H in parallel relation to the mirrors, in order to increase the amount of the reflected light beam towards second straight portions 22H from a first straight portion 21H.

Figure 17:
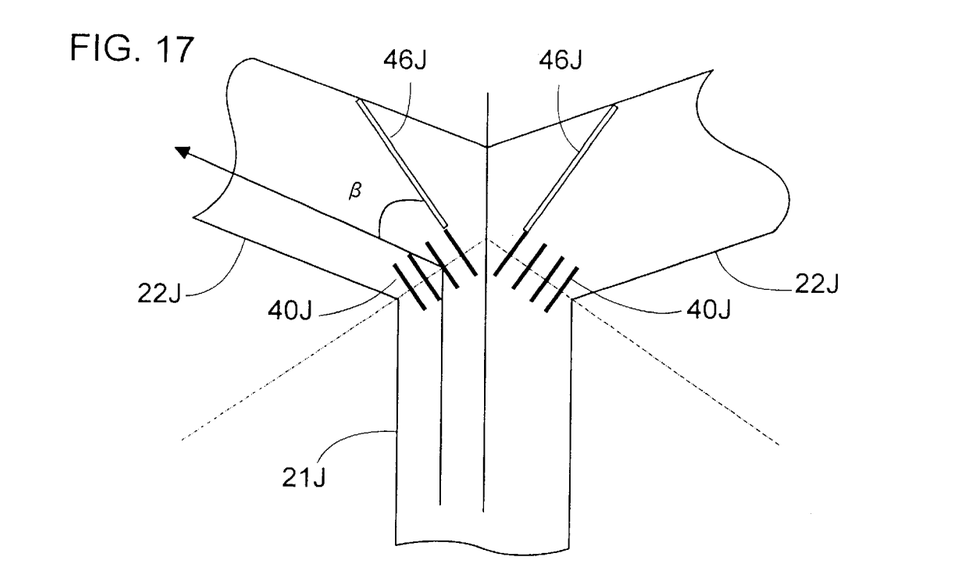

FIG. 17 illustrates an angled illumination tube in accordance with a tenth embodiment of the present invention which is similar to the fifth embodiment of FIG. 12 except for the addition of a supplementary mirror 46J. The supplementary mirror 46J is provided for each of the arrays of mirrors 40J in the same plane of an outermost mirror 40J in each array remote from a first straight portion 21J, thereby increasing the amount of the reflected light beam towards second straight portions 22J.

Figure 18:
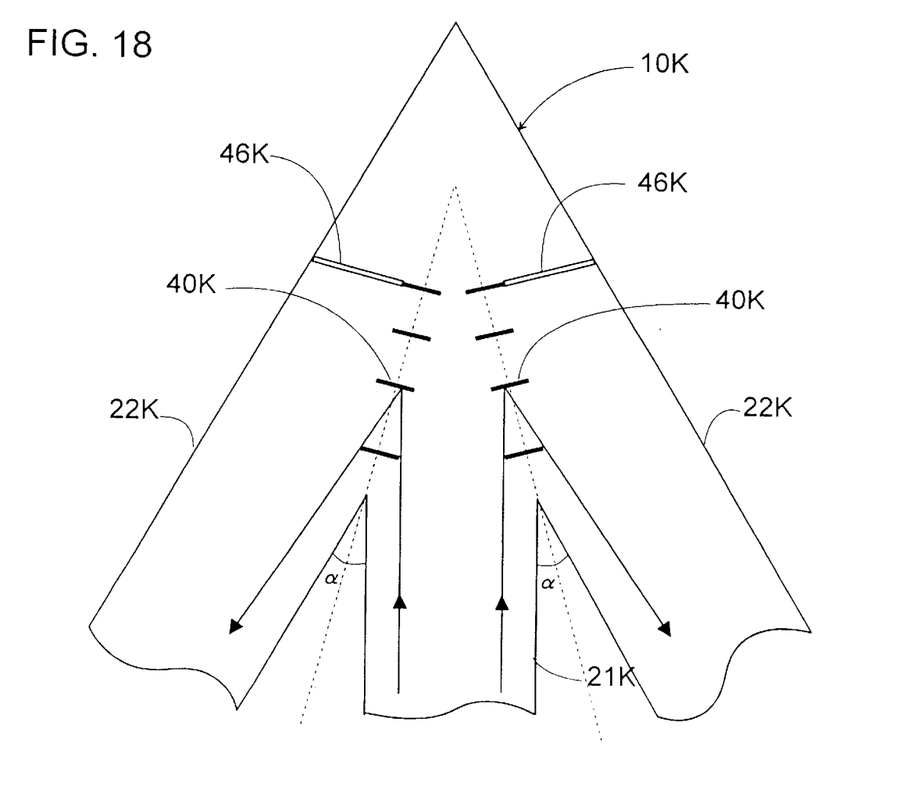

FIG. 18 illustrates an angled illumination tube in accordance with an eleventh embodiment of the present invention. The tube includes a conduit 10K which is composed of a first straight portion 21K and a pair of second straight portions 22K which extends at an acute angle (α) with respect to the first straight portion. A combination of array of mirrors 40K and a supplementary mirror 46K is disposed within a bend 25K between the first straight portion 21K and the second straight portions 22K. The mirrors 40K of the array are selected to satisfy the relation as defined in the first embodiment, and the supplementary mirror 46K is disposed in the same plane of the outermost mirror 40K remote from the first straight portion. The outermost mirrors 40K in the adjacent arrays are spaced to form therebetween a gap for passing therethrough the light beam for illumination of an arcuate corner of the bend 25K.

It should be noted that the illumination tubes of the above embodiments and modifications can be utilized as a light guide joint between solid tubes such as glass tubes, bundles tubes made of glass-fibres, and like solid structure that direct the light therethrough while emitting a part of the light for illumination purpose.

This application is based on application No. 10-213304 filed in Japan, the content of which is incorporated hereinto by reference.

What is claimed is:

1. An angled illumination tube adapted to be used in combination with a light source providing a light beam, said angled illumination tube comprising:

an angled transparent tubular conduit having a first end and a second end on opposite longitudinal ends of said conduit, said conduit having a bend between said first and second ends and having said first end adapted to receive the light beam from said light source in order to guide the light beam along a length of said conduit while allowing a part of the light beam to pass through a wall of said conduit; and a reflector disposed within said bend to reflect the light beam from said first end to direct a reflected light beam towards said second end, said reflector defining an incident light axis along which said light beam is guided to said reflector, and a reflected light axis along which said reflected light beam is directed to said second end; wherein said reflector comprises an array of mirrors arranged in parallel relation with each other along a bisector which divides an included angle (α) between said incident and reflected light axes at an angle (θ) with respect to said incident light axis, two adjacent ones of said mirrors being spaced at a distance (d) along said bisector and of a uniform length (L) measured within a plane including said incident and reflected light axes, said mirrors being configured to satisfy the following relation:

$$d\tan\theta \le L \le \frac{3d}{2}\tan\theta.$$

2. The angled illumination tube as set forth in claim 1, further including a supplementary reflector located adjacent to one of said mirrors at a position offset from said array of said mirrors towards said second end in order to increase an amount of said reflected light beam directed towards said second end.

3. The angled illumination tube as set forth in claim 2, wherein said supplementary reflector is in the form of a transparent prismatic mirror.

4. The angled illumination tube as set forth in claim 1, wherein said mirror in the array are held in a frame which is transparent to said light beam.

5. The angled illumination tube as set forth in claim 1, wherein said tubular conduit comprises:

a pair of first and second straight cylinders connected by said bend which is of a generally semi-circular arc extending about a center point and merges at its opposite ends into said first and second straight cylinders to define thereat a bend starting point and a bend ending point, an array of first deflectors which are located at said bend starting point and which are arranged along a starting line passing through said center point in a generally perpendicular relation to an axial length of said first straight cylinder, said first deflectors being angled with respect to said axial length of said first straight cylinder to direct the light beam from said light source into said bend;

a plurality of the arrays of said mirrors are located between said bend starting point and said bend ending point at an angularly spaced relation with one another about said center point, said mirrors in each array being arranged along each one of radial lines which pass commonly through said center point and form individual center angles of less than 90° with adjacent one of said radial lines so as to direct the light beam generally along a curved path of said bend, an array of second deflectors which are located at said bend ending point and which are arranged along an ending line passing through said center point in a generally perpendicular relation to an axial length of said second straight cylinder, said second deflectors being angled with respect to said axial length of said second straight cylinder to direct the reflected light beam from said mirrors along the axial length of said second cylinder.

* * * * *